United States Patent [19]
Böe

[11] Patent Number: 5,763,090
[45] Date of Patent: Jun. 9, 1998

[54] GLASS-LAMINATED CONCRETE BUILDING ELEMENT

[76] Inventor: Hans Peter Böe, Speldorfer Strasse 17-19, D-46049 Oberhausen, Germany

[21] Appl. No.: 557,920

[22] Filed: Nov. 14, 1995

[51] Int. Cl.⁶ ..................................................... B32B 17/00
[52] U.S. Cl. ........................... 428/426; 428/70; 428/702; 428/703; 52/309.17; 52/309.3; 52/506.01
[58] Field of Search .................................... 428/702, 703, 428/426, 70; 52/309.17, 309.3, 506.01

[56]  References Cited

FOREIGN PATENT DOCUMENTS

| | | |
|---|---|---|
| 818408 | 10/1951 | Germany. |
| 869312 | 3/1953 | Germany. |
| 7318297 | 8/1973 | Germany. |
| 2451692 | 5/1976 | Germany. |
| 3418002 | 11/1985 | Germany. |
| 8716249 | 5/1989 | Germany. |

*Primary Examiner*—Timothy Speer
*Attorney, Agent, or Firm*—Herbert Dubno; Andrew Wilford

[57] ABSTRACT

A building element has a slab of concrete having a face, a sheet of glass juxtaposed with the face, and a layer of mortar between and bonded monolithically to the glass sheet and the slab face. The mortar consists essentially of a fine-particulate neutral aggregate, cement, and an aqueous dispersion of a polyacrylic-acid derivative having a logarithmic decrement according to DIN 53,445 which is at a maximum below 0° C. The aqueous dispersion is in an amount insufficient to fully hydrate the cement. In addition the mortar layer has a thickness and a content of polyacrylic acid sufficient to permit differential thermal expansion of the slab and glass without cracking of the mortar layer.

19 Claims, 2 Drawing Sheets

APPLY MORTAR

MOUNT IN FORM

POUR CONCRETE

CORE

STRIP FORM 5,763,090

GLASS-LAMINATED CONCRETE BUILDING ELEMENT

FIELD OF THE INVENTION

The present invention relates to a concrete building element. More particularly this invention concerns such an element either formed in situ or prefabricated that has at least one face to which is laminated a sheet of glass that may be left exposed for a decorative function or that may be concealed so it serves a purely technical or practical function.

BACKGROUND OF THE INVENTION

The standard procedure for cladding a concrete body or slab with a glass involves either fastening the glass to the concrete body by mechanical clips, or by use of a synthetic-resin adhesive. The use of mechanical clips provides relatively limited holding of the glass on the body and is quite difficult to execute properly. A synthetic-resin adhesive also can age and fail, or the differential thermal expansion of the glass and concrete body can break the bond and cause the glass to come loose. Neither of these procedures is good enough for use securing decorative glass fagade panels to a building since the glass might come loose and fall, creating an extremely dangerous situation.

Alternatively Austrian patent document 196,079 proposes securing glass to a concrete body by applying to the glass an aqueous plastic polyvinyl-acetate dispersion containing 15% to 20% of solid matter, a plasticizer, and a die. Sand is strewed on a layer of this substance in order to protect the plastic layer from damage, e.g. during shipping. The sand layer also increases the ability of cement mortar to stick to the glass plate for adhering it to a wall. Such an arrangement is fairly complex and expensive as several layers have to be applied to the glass sheet. In addition it produces and inferior bond to the concrete.

OBJECTS OF THE INVENTION

It is therefore an object of the present invention to provide an improved glass-laminated building element.

Another object is the provision of such an improved glass-laminated building element which overcomes the above-given disadvantages, that is which surely and simply bonds a sheet of glass to a concrete body so that it can be counted on to stay in place.

A further object is to provide a simple way of bonding glass sheets to a concrete slab.

SUMMARY OF THE INVENTION

A building element has according to the invention a slab of concrete having a face, a sheet of glass juxtaposed with the face, and a layer of mortar between and bonded monolithically to the glass sheet and the slab face. The mortar consists essentially of a fine-particulate neutral aggregate, cement, and an aqueous dispersion of a polyacrylic-acid derivative having a logarithmic decrement according to DIN 53,445 which is at a maximum below 0° C. The aqueous dispersion is in an amount insufficient to fully hydrate the cement. In addition the mortar layer has a thickness and a content of polyacrylic acid sufficient to permit differential thermal expansion of the slab and glass without cracking of the mortar layer.

According to a feature of the invention the glass sheet is at least 4 mm thick and at most 8 mm thick. While the glass can be standard, according to this invention it is prestressed. It can be simple laminated glass or even float glass. The maximum size of the sheets is about 4 m ×4 m, and even insulating or low-e glass can be used.

The mortar can be applied by rolling or spraying or can even be troweled in place to have a thickness of between 2 mm and 7 mm, preferably 4 mm and 6 mm. The mortar is not cured or hydrated completely before the concrete is cast against it to ensure an excellent bond.

The aggregate according to the invention has a particle size of between 0.1 mm and 1.0 mm, preferably 0.2 mm and 0.7 mm and is preferably made of quartz sand or ground glass. The cement is Portland cement and it may be tinted so that clear glass can be used and the fabricator can easily impart any desired color to the building element.

According to the invention the polyacrylic-acid derivative is an acrylate-base polymer, that is acrylic-acid esters and their derivatives with acrylic acid or acrylonitrile as basic chain molecule. The polyacrylic-acid derivative can also be a copolymer with acrylonitrile, acrylic acid, or acrylate as comonomer. Even methacrylic acid and its derivatives are usable as comonomer. The polyacrylic-acid derivative according to the invention can be a polymer mixture of different polyacrylic-acid derivatives. According to a feature of the invention the polyacrylic-acid derivative is a polyacrylate, preferably an acrylic resin. According to the invention polyacrylate adhesive can be mixed into the mortar. Preferably the ratio of acrylonitrile comonomer to polyacrylic-acid derivative is at least 2% by weight. The mortar is made with an aqueous dispersion, for example an aqueous emulsion, of the polyacrylic-acid derivative.

In accordance with the invention the polyacrylic-acid derivative has a logarithmic decrement according to DIN 53,445 which reaches a maximum below 0° C. This is the logarithmic decrement A of the torsional vibration damping with a torsional vibration test according to DIN 53,445 with the polyacrylic-acid derivative as test body. Preferably a polyacrylic-acid derivative is used whose logarithmic decrement attains a maximum at temperatures of more than −8° C. It is known from German patent 2,827,382 to add a plastic as a binder in concrete whose logarithmic decrement according to DIN 53,445 reaches a maximum at temperatures below −8° C. The goal of this is to make compositions that can be used at temperatures below 0° C. while retaining sufficient elastoplasticity, resistance to wear, and impact resistance.

The invention is based on the recognition that a polyacrylic-acid derivative of the above-described type is effective as a bonding agent not only at temperatures of less than 0° C., but also in the range of −50° C. to +200° C., both between the mortar layer and the glass and between the mortar layer and the concrete. Surprisingly, high temperatures, such as experienced by the building element according to this invention when it is left in the sun, do not impair the bond. Thus the building element according to the invention can be counted on to resist the onslaughts of climate and weather, easily withstanding the thermal stresses such an element is subjected to. The person skilled in the art would not expect such a solid and heat-sensitive bond between the layer and the glass sheet would be so resistant to differential thermal stresses.

The good bond between the layer and the glass sheet is probably created by a molecular interaction of the polyacrylic-acid derivative with the glass. Presuming that as a result of the cement in the mortar, in particular because of the alkaline components of the cement, the face of the glass sheet is microscopically roughened. This roughening or etching forms free silane groups on the glass face which are capable of chemical and/or physical interaction with the functional groups of the acrylic-acid monomer units. Apparently relatively solid hydrogen-bridge formations are formed between these functional groups and the silane groups of the glass surface. It has surprisingly been discovered that in this manner it is possible to produce a solid bond between an organic polyacrylic polymer and the inorganic material of the glass. In spite of this solid bond between the glass and the mortar layer the mortar surprisingly does not visibly attack the glass. The alkaline components of the Portland cement etch the surface of the glass sheet and thus microscopically roughen it so that one can get a very effective interaction between the glass surface or the silane groups forming it and the carboxyl and/or nitrile groups of the polyacrylate copolymer. This is particularly the case with float glass.

Preferably according to the invention the concrete is cured while engaging the mortared side of the glass sheet so that a monolithic bond is formed, that is no intermediate layer is needed to bond the concrete to the mortar. The monolithic bond is formed as the concrete cures while in contact with the mortar which is, as described above, not fully hydrated. The bond is monolithic because the concrete finishes the hydration of the mortar. Thus the concrete and mortar join at the molecular or crystalline level to form the monolithic bond, as the wet concrete will invade the mortar since same is not fully hydrated. The polymer in the mortar will augment the bond by ensuring that the water in the concrete will enter the partially hydrated mortar.

The polyacrylic-acid derivative and the thickness of the mortar ensures a uniform surface bond between the glass sheet and the concrete. The polyacrylic-acid derivative gives a certain elasticity to the mortar layer so that, even though the coefficients of thermal expansion of concrete and glass are normally not the same, these two elements can move somewhat relative to each other without either becoming detached from the mortar layer. According to the invention the aqueous dispersion has 50% to 65% by weight of polyacrylic-acid derivative and 35% to 50% by weight water, preferably 55% to 60% by weight of polyacrylic-acid derivative and 40% to 45% by weight water. The polyacrylate according to this invention ensures that the bond will be very durable, with an apparently unlimited life. The mortar according to the invention has the following composition by weight aggregate 10% to 40% (pref. 25% to 35%), cement 10% to 40% (pref. 25% to 35%), and aqueous dispersion 10% to 40% (pref. 25% to 35%), with of course the total being 100%.

The invention is based on the discovery that such a mortar can be counted on to bond perfectly to the glass, and will also form a perfect monolithic bond with the concrete. At the same time the mortar retains enough elasticity that it can permit the glass and concrete to expand and contract thermally at different rates without cracking or detaching.

The method of making a building element according to this invention therefore comprises the steps of first applying to a face of a glass sheet a layer of a mortar as described above. Then the mortar is at least partially cured, enough to make it possible to handle the glass sheet and a form is constructed using the glass sheet carrying the mortar layer as at least a portion of a wall of the form with the mortar layer turned inward into the form. The form is then filled with uncured pourable concrete and thereafter the concrete is cured in the form while in contact with the mortar such that the concrete bonds monolithically to the mortar layer. Normally after curing the concrete in the form all of the form except for the glass sheet is stripped from the cured concrete to leave the glass sheet adhered by the mortar layer to the concrete.

When several glass sheets are mounted coplanar, the mortar or special gaskets can fill the joints between adjacent sheets. Both sides of the concrete slab or body can be clad in glass in this manner, or only the outside face for an attractive facade treatment. In fact the glass sheets not only serve a function in the finished product, but can in effect serve as the form for the concrete during its casting. In any case the prior-art step of securing the glass to the concrete body is completely eliminated, while at the same time achieving a superior attachment.

The building element according to this invention can serve many functions. It is ideally suited for use as facade panels of a building, even a high rise. The element could further be used to make a swimming pool or a bath enclosure, as the glass surface is particularly suitable in such an application. Tinting the mortar when the glass is clear allows virtually any desired color to be produced for varied design results.

BRIEF DESCRIPTION OF THE DRAWINGS

The above and other objects, features, and advantages will become more readily apparent from the following description, reference being made to the accompanying drawing in which.

SPECIFIC DESCRIPTION

Figure 1:
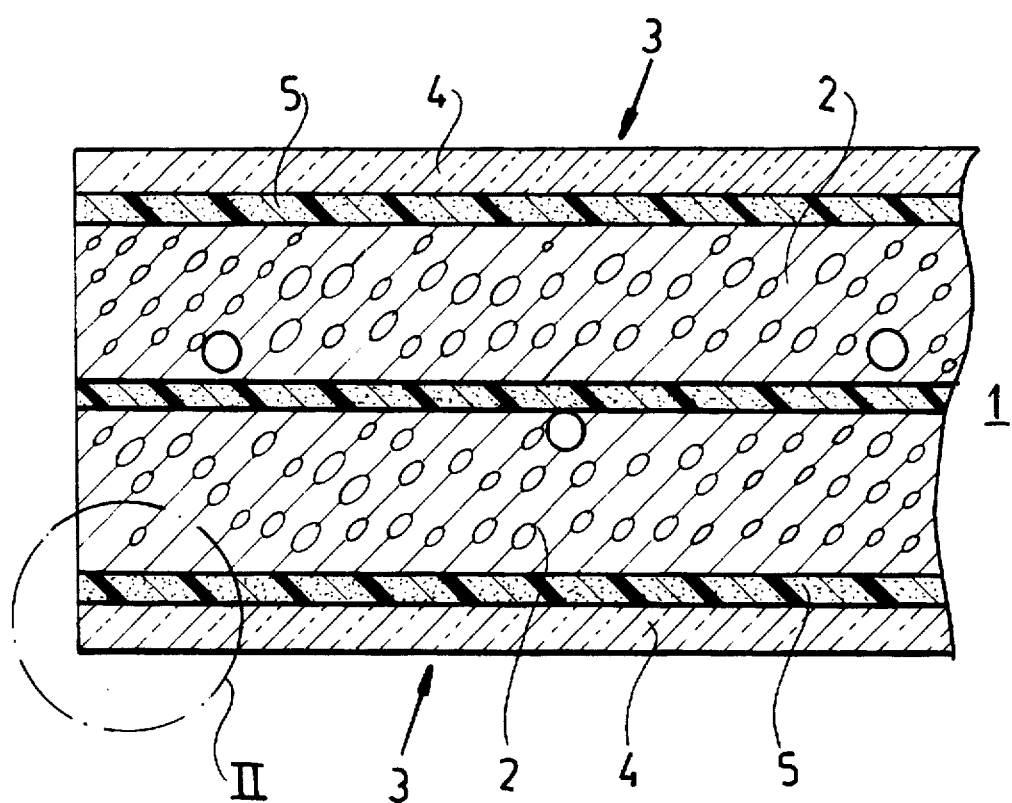
FIG. 1 is a section through a building element according to the invention.
Figure 2:
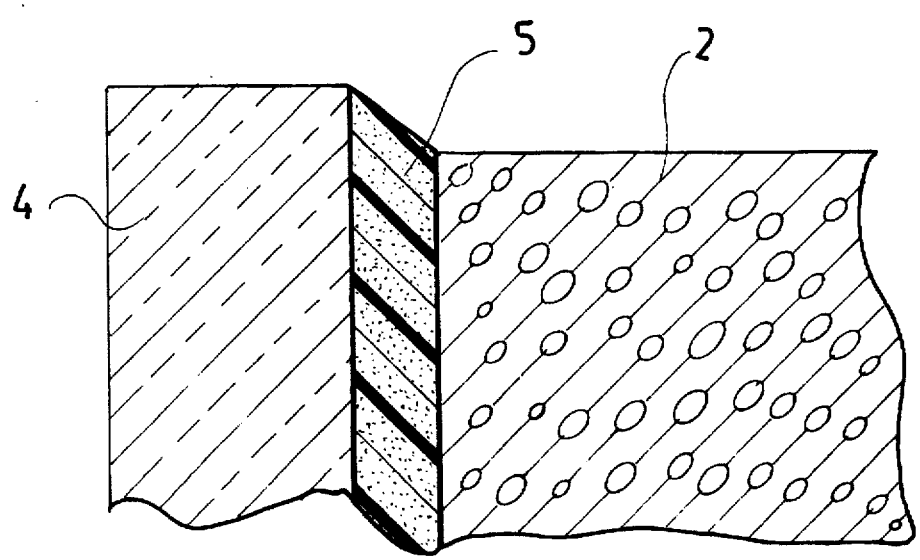
FIG. 2 is a large-scale view of the detail indicated at II in FIG. 1.

As seen in FIG. 1 a building element 1 according to this invention consists basically of a reinforced-concrete slab 2 to each of whose parallel opposite faces is secured a facade panel 3 comprised of a planar glass sheet 4 and a mortar layer 5. FIG. 2 shows how the mortar layer 5 is sufficiently elastic that in the event of differential thermal expansion between the glass 4 and concrete 2, the layer 5 can deform without tearing or ripping while remaining attached on both sides.

As seen in FIGS. 3a through 3e such a building element can be formed, either in situ or at a fabrication plant, by first applying the mortar layer (see FIG. 3a) to a face of the glass sheet by spraying the mortar 6 thereon by means of a nozzle 7. Of course the layer 5 could also be formed by troweling or rolling on the mortar 6. Once the layer 5 has cured sufficiently to be stable, the sheet 4 is mounted (see FIG. 3b) as part of a form 8, for instance by being secured therein as one wall by suction holders 9. In fact the layer 5 could be applied when the sheet 2 is mounted in this form 8.

Figure 3A:
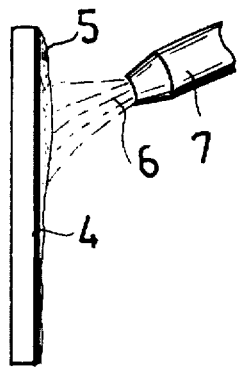
FIGS. 3a through 3e are small-scale schematic views illustrating the method of this invention.
Figure 3B:
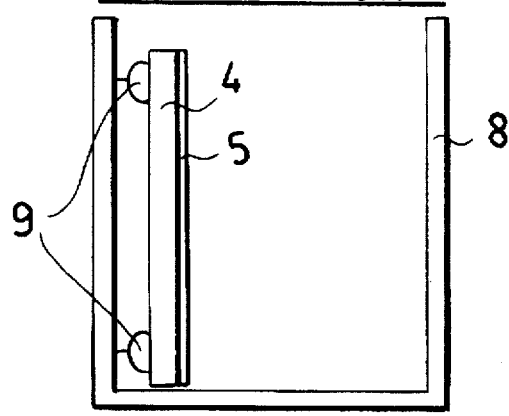
Figure 3C:
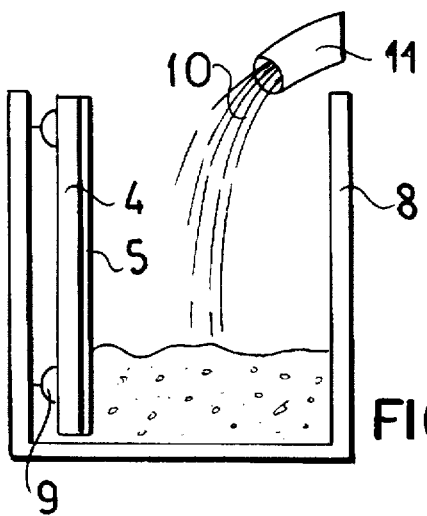
Figure 3D:
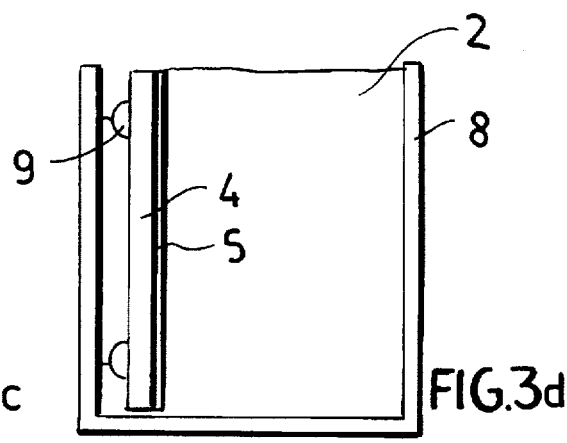
Figure 3E:
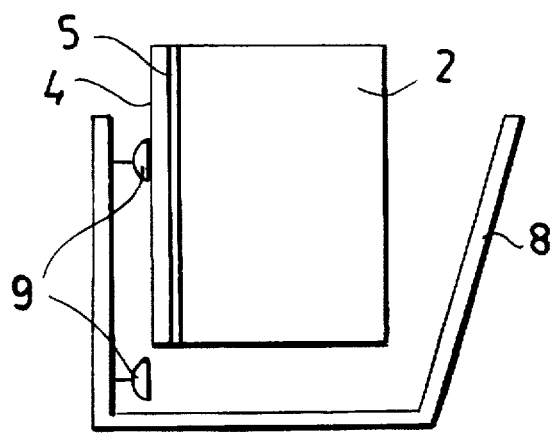

Then concrete 10 is poured from a hose 11 or the like into the form 8 (see FIG. 3c), after which the concrete cures to form the body 2 (FIG. 3d). Finally the mold 8 is stripped away (FIG. 3e) leaving the glass plate 4 adhered to the body 2 by the mortar layer 5.

EXAMPLES

A mixture of equal parts by weight of quartz sand, portland cement, and an aqueous acrylate dispersion is made. The aqueous dispersion consists by weight of 59% acrylate and 41% water, the acrylate being a copolymer with 4% by weight acrylonitrile as comonomer. This polyacrylic-acid derivative has a logarithmic decrement according to DIN 53,445 that is at a maximum at −37°C. The quartz sand has a particle size of 0.4 mm.

Four glass sheets 1 of single-sheet safety glass measuring 4 mm thick, 1200 mm wide, and 1350 mm long are each provided with a 5 mm thick layer of the mortar. The four sheets are fitted in a form in a rectangle next to and above each other and held in place with vacuum grippers on the frame of the form which is set up to form a vertical building wall with the glass turned outward. The other sides of the form are made with the standard form plates to make a slab 200 mm thick. The form is filled with standard construction-grade concrete and reinforcement may be provided in it prior to the pour.

After 20 hours curing time the form is stripped off the cured concrete body, leaving the glass sheets in place on its outer face.

Six months later an attempt was made to separate the glass from the concrete. This could only be done with a hammer and chisel by breaking the glass, and even then the mortar and even some of the concrete ended up sticking to the pieces of broken glass. There was no failure of the bond between the glass and the mortar or between the mortar and the concrete. During the half year prior to the test the body was exposed to weather.

More particularly another workpiece was made using the above-given procedure, but using eight glass sheets measuring 4 mm ×400 mm ×400 mm, that were laminated to one face of a concrete body, with a 5 mm thick layer of the above-described mortar between the glass and the concrete which was 60 mm thick. The thus produced element was suspended for six months in a body of water, after which a traction force of 1.4 N/mm² was applied to them. This force did not loosen or strip the glass from the concrete body. The workpiece was returned to the body and one year later the test was tried again with the same results.

I claim:

1. A building element comprising:
   a slab of concrete having a face;
   a sheet of glass juxtaposed with the face; and
   a layer of mortar between and bonded monolithically to the glass sheet and the slab face, the mortar consisting essentially of:
      a fine-particulate neutral aggregate, cement, and
      an aqueous dispersion of a polyacrylate having a logarithmic decrement according to ISO 537 which is at a maximum below 0° .C. the aqueous dispersion being in an amount insufficient to fully hydrate the cement,
   the mortar layer having a thickness and a content of polyacrylic acid sufficient to permit differential thermal expansion of the slab and glass without cracking of the mortar layer.

2. The building element defined in claim 1 wherein the glass sheet is at least 4 mm thick.

3. The building element defined in claim 2 wherein the glass sheet is at most 8 mm thick.

4. The building element defined in claim 1 wherein the glass sheet is prestressed.

5. The building element defined in claim 1 wherein the glass sheet is a float glass sheet.

6. The building element defined in claim 1 wherein the mortar has a thickness of between 2 mm and 7 mm.

7. The building element defined in claim 1 wherein the mortar has a thickness of between 4 mm and 6 mm.

8. The building element defined in claim 1 wherein the aggregate has a particle size of between 0.1 mm and 1.0 mm.

9. The building element defined in claim 1 wherein the aggregate has a particle size of between 0.2 mm and 0.7 mm.

10. The building element defined in claim 1 wherein the cement is Portland cement.

11. The building element defined in claim 1 wherein the polyacrylate is an acrylic resin.

12. The building element defined in claim 1 wherein the polvacrylate is a copolymer with acrylonitrile as comonomer.

13. The building element defined in claim 12 wherein the ratio of acrylonitrile comonomer to polyacrylate is at least 2% by weight.

14. The building element defined in claim 1 wherein the aqueous dispersion has 50% to 65% by weight of polyacrylate and 35% to 50% by weight water.

15. The building element defined in claim 1 wherein the aqueous dispersion has 55% to 60% by weight of polyacrylate and 40% to 45% by weight water.

16. The building element defined in claim 1 wherein the mortar has the following composition by weight:
   aggregate 10% to 40%,
   cement 10 % to 40%, and
   aqueous dispersion 10% to 40%.

17. The building element defined in claim 1 wherein the mortar has the following composition by weight:
   aggregate 25% to 35%,
   cement 25% to 35%, and
   aqueous dispersion 25% to 35%.

18. A building element made by the method comprising the steps of:
   applying to a face of a glass sheet a layer of a mortar consisting essentially of
      a fine-particulate neutral aggregate, cement, and
      an aqueous dispersion of a polyacrylate having a logarithmic decrement according to ISO 537 which is at a maximum below 0° C., the aqueous dispersion being in an amount insufficient to fully hydrate the cement;
   thereafter curing the mortar on the face of the glass sheet;
   constructing a form using the glass sheet carrying the mortar layer as at least a portion of a wall of the form with the mortar layer turned inward into the form;
   filling the form with concrete; and
   thereafter curing the concrete in the form such that the concrete bonds monolithically to the mortar layer.

19. The building element defined in claim 18 wherein the method further comprises the step after curing of the concrete in the form of
   stripping all of the form except the glass sheet from the cured concrete and leaving the glass sheet adhered by the mortar layer to the concrete.

* * * * *